May 7, 1968

D. E. BOOTH 3,381,793

TRANSFER DEVICE

Original Filed Feb. 3, 1965

INVENTOR
DOUGLAS E. BOOTH

BY
Barnes, Kisselle, Raisch & Choate

ATTORNEYS

May 7, 1968 D. E. BOOTH 3,381,793
TRANSFER DEVICE
Original Filed Feb. 3, 1965 10 Sheets-Sheet 7

INVENTOR
DOUGLAS E. BOOTH
BY
Barnes, Kisselle, Raisch, & Choate
ATTORNEYS May 7, 1968   D. E. BOOTH   3,381,793
TRANSFER DEVICE Original Filed Feb. 3, 1965   10 Sheets-Sheet 10

INVENTOR
DOUGLAS E. BOOTH
BY
Barnes, Kisselle, Raisch & Choate
ATTORNEYS

United States Patent Office 3,381,793
Patented May 7, 1968

3,381,793
TRANSFER DEVICE
Douglas E. Booth, Dearborn Heights, Mich., assignor to Bernard J. Wallis, Dearborn, Mich.
Continuation of application Ser. No. 430,044, Feb. 3, 1965. This application Feb. 15, 1967, Ser. No. 628,195
11 Claims. (Cl. 198—19)

ABSTRACT OF THE DISCLOSURE

A transfer device for moving workpieces through successive stations including a carriage movable in a path along the stations, the carriage having work-gripping fingers thereon movable into work-engaging and retracted positions, and a barrel cam having two cam tracks with cam followers therein one for actuating the carriage and the other for actuating the work-gripping fingers.

---

This application is a continuation of my prior co-pending application Ser. No. 430,044 filed Feb. 3, 1965, now abandoned.

This invention relates to a transfer device, and more particularly to a device designed to move a succession of workpieces through a plurality of successive stations in a rectilinear path.

Transfer devices of the type referred to above are frequently used for moving workpieces progressively through the successive stations of a progressive die, for example, and can also be used in such other applications as drilling machines and the like where the workpieces are subjected to one or more distinct operations at a plurality of successive stations on the machine where the workpieces are held stationary.

In U.S. Patents Nos. 2,929,485 dated Mar. 22, 1960 and 3,135,395 dated June 2, 1964, there is disclosed a transfer device of the type described above which includes a carriage or slide mounted on a support for reciprocation in a straight path and a plurality of fingers are mounted on the carriage or slide for reciprocation in a path perpendicular to the path of travel of the carriage. At their free ends the fingers are provided with work-engaging members which, when the fingers are extended, are adapted to engage a workpiece and index and advance the workpiece to the next successive station when the carriage is shifted in one direction, and which are adapted to be retracted out of engagement with the workpieces when the carriage is retracted to a starting position. In the transfer devices disclosed in said patents, the respective motions of the carriage and work-engaging fingers are controlled essentially by means of a gear rack having a lost-motion connection with the carriage. The arrangement disclosed in said patents is such that when the gear rack is moving relative to the carriage the work-engaging fingers are being operated and when the gear rack is moving with the carriage, the carriage is being moved between successive stations.

The present invention is similar to the transfer devices disclosed in the aforementioned patents in that the carriage and the work-engaging fingers operate in the same general manner but differs therefrom in that the means for actuating the carriage and the work-engaging fingers comprises a rotary cam with a cam follower on the carriage and another cam follower operatively connected with the fingers, the cam being rotatable to produce the indexing motion of the carriage and extension as well as retraction of the fingers.

The present invention has for its primary object the provision of a transfer device of simple and economical construction and which at the same time is adapted to efficiently transfer workpieces between successive stations in the above-described manner.

A further object of the invention resides in the provision of a transfer device wherein movement of the carriage and movement of the work-engaging fingers are independently controlled by two cam followers each of which rides in its own cam groove on a rotary cam.

Other objects and advantages of the invention will become apparent from the following description taken in conjunction with the drawings, in which.

Figure 1:
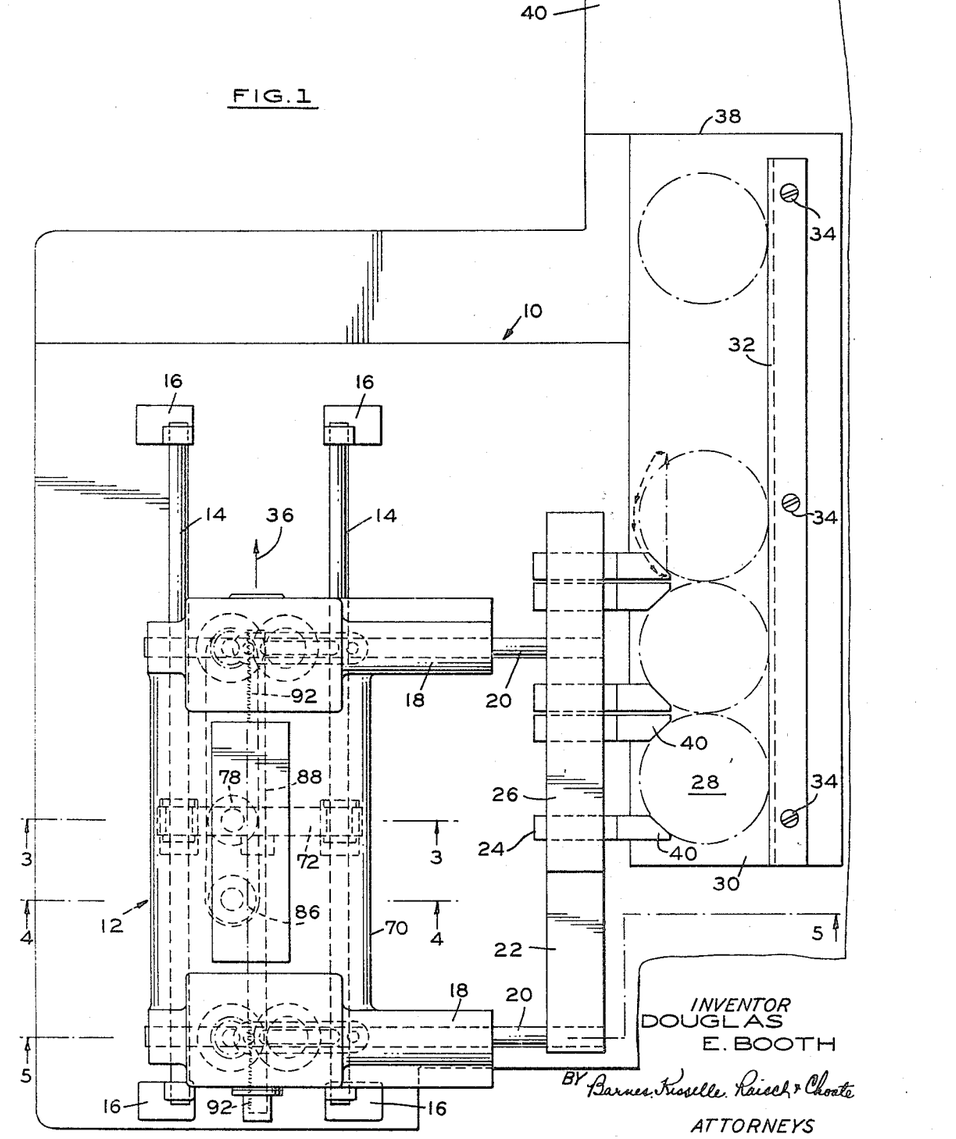
FIG. 1 is a top plan view of one form of transfer device according to the present invention.
Figure 2:
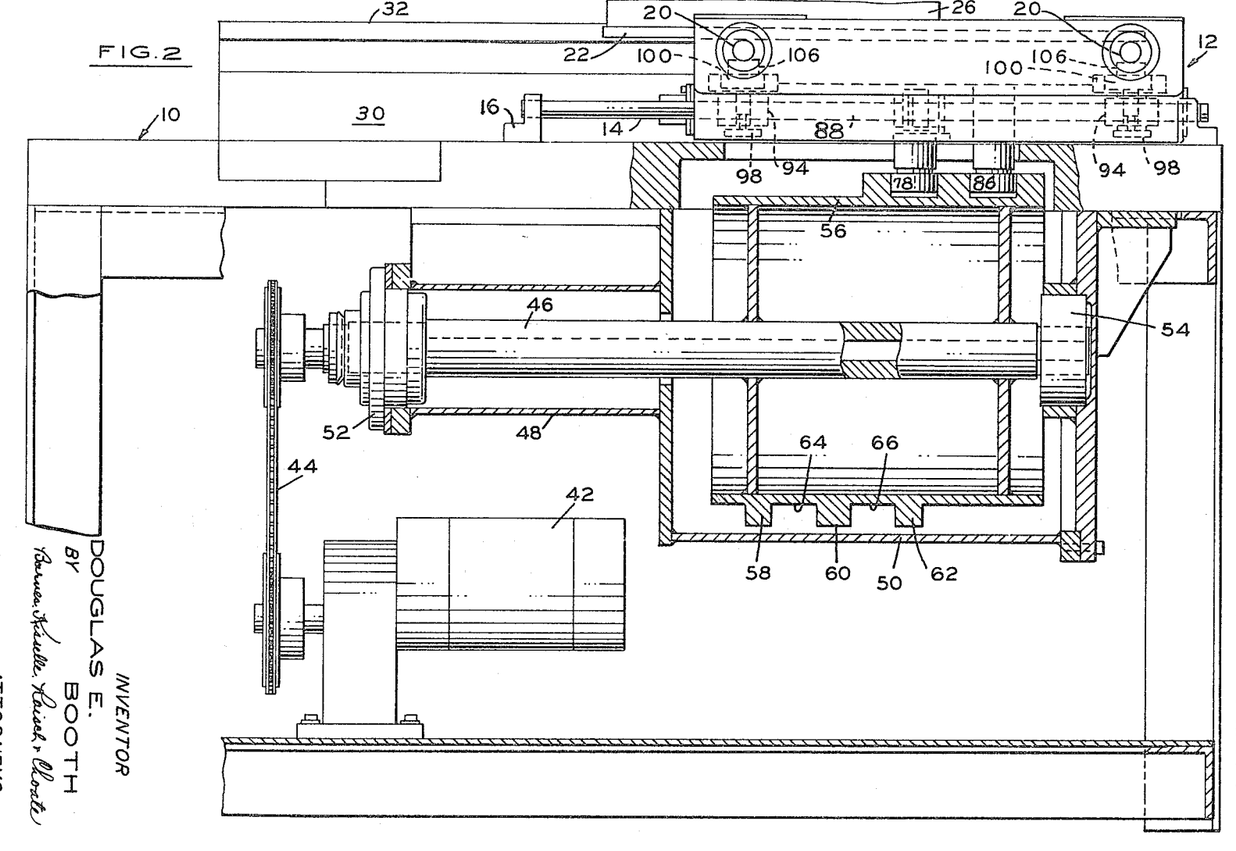
FIG. 2 is a vertical sectional view, with parts broken away, of the transfer device illustrated in FIG. 1.
Figure 5:
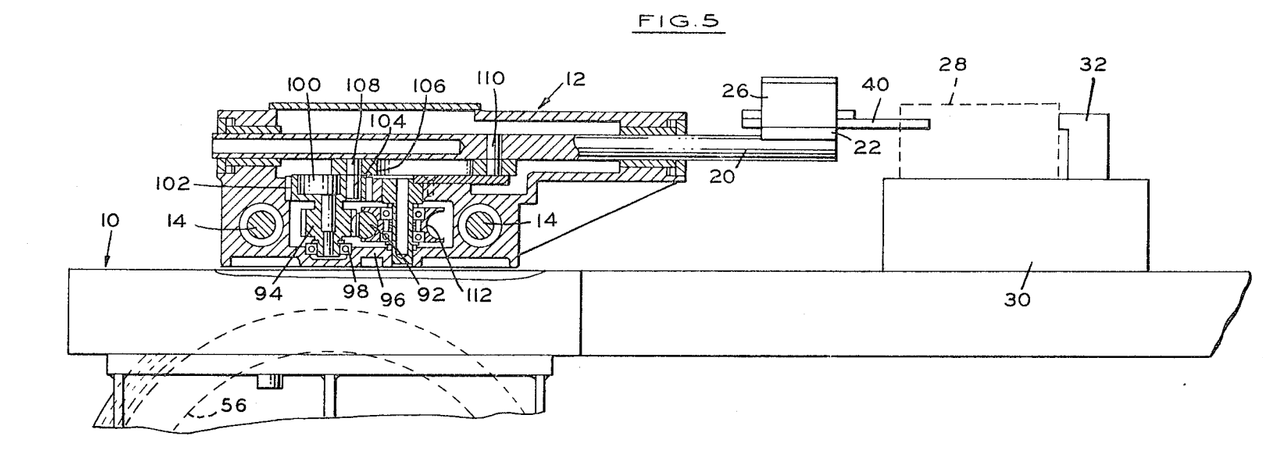
FIG. 5 is a sectional view along the line 5—5 in FIG. 1.
Figure 6:
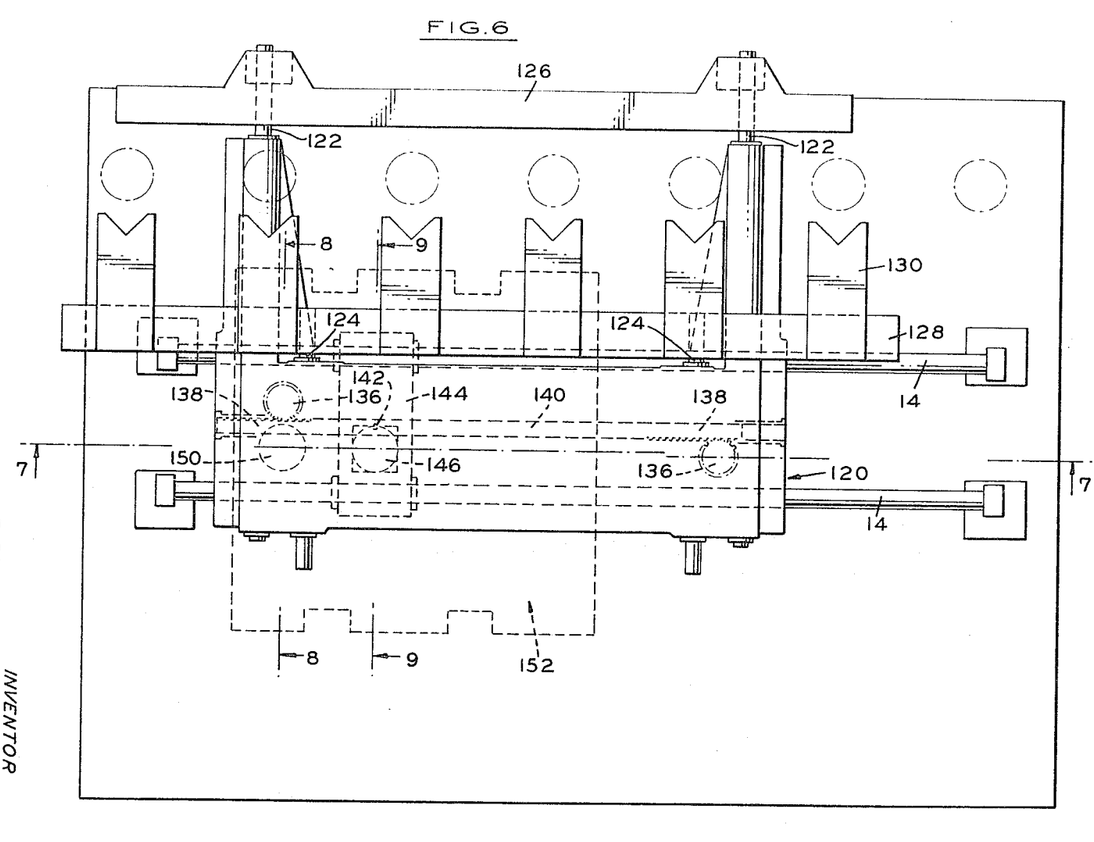
FIG. 6 is a top plan view of a modified form of transfer device according to the present invention.

Referring first to FIGS. 1, 2 and 5, the transfer device of the present invention includes a base 10 on which a carriage or slide 12 is guided for movement in a rectilinear path by means of a pair of guide bars 14 mounted on base 10 by upright brackets 16. Carriage 12 is in the form of a casting through which the guide bars 14 extend, the carriage being provided with suitable bushings or bearings for enabling the carriage to slide smoothly and easily on guide bars 14.

At one side thereof carriage 12 is provided with a pair of tubular bearing portions 18 which extend laterally from carriage 12 in a direcion perpendicular to the path of travel of carriage 12 on guide bars 14. Within each bearing portion 18 there is slidably arranged shaft 20. The free outer ends of shafts 20 are interconnected by a tie-bar 22 on which a plurality of work-gripping fingers 24 are secured by means of a bracket 26.

In the arrangement illustrated in FIGS. 1 through 5, the work-engaging fingers 24 are adapted to engage with cylindrical workpieces 28 at spaced points at one side thereof. Workpieces 28 are supported on a guide block 30 having a fixed guide rail 32 mounted thereon as by screws 34. In FIG. 1 the work-engaging fingers 24 are shown in their extended position engaging the workpieces 28 so that when the carriage 12 is indexed in the direction of the arrow 36 the workpieces 28 are shifted toward the end 38 of guide block 30 onto a conveyor belt or the like, as at 40, for removal to another location. Mechanism about to be described is provided for shifting fingers 24 to the extended position illustrated in FIG. 1 and to a retracted position where the ends 40 of the fingers clear the outer peripheral surface of the workpieces 28. This mechanism also includes a means for shifting carriage 12 lengthwise of guide bars 14.

Referring now to FIG. 2, the mechanism for actuating carriage 12 and shafts 20 on which fingers 24 are mounted is there illustrated. This mechanism includes an electric motor 42 having a chain drive as at 44, with one end of a shaft 46. Shaft 46 extends axially through a tube 48 secured to one end of a housing 50 mounted on the underside of support 10. At one end shaft 46 is journalled in a bearing 52 at the end of tube 48 and at i s other end shaft 46 is jounalled in a bearing 54 in one end wall of housing 50. To the portion of the horizontally extending shaft 46 within housing 50 there is secured, as by welding, a cylinder 56. Cylinder 56 is coaxial with the shaft 46 and has a plurality of cam bar 58, 60 extending around the cylindrical wall thereof to form a pair of cam grooves 64, 66. Bars 58, 60, 62 can be formed integrally with cylinder 56 or may be separately formed and secured to the cylinder as by welding.

Figure 3:
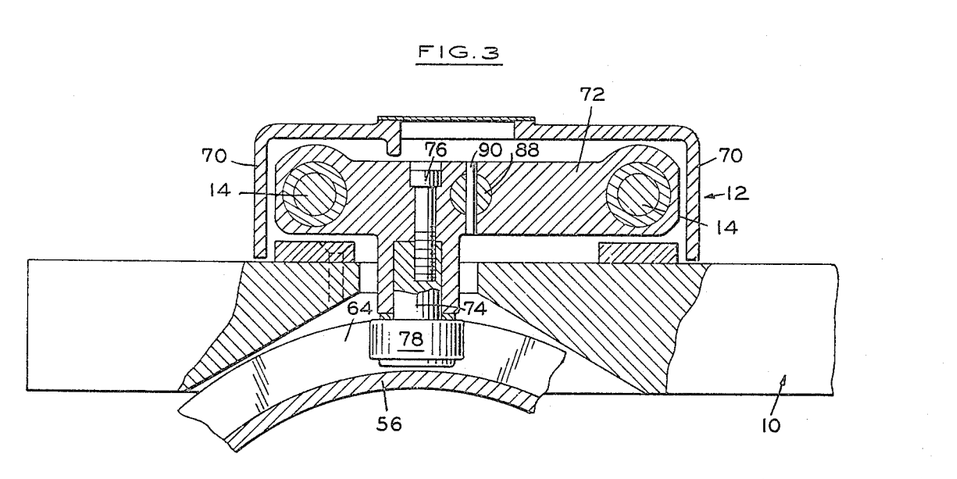
FIG. 3 is a sectional view along the line 3—3 in FIG. 1.
Figure 4:
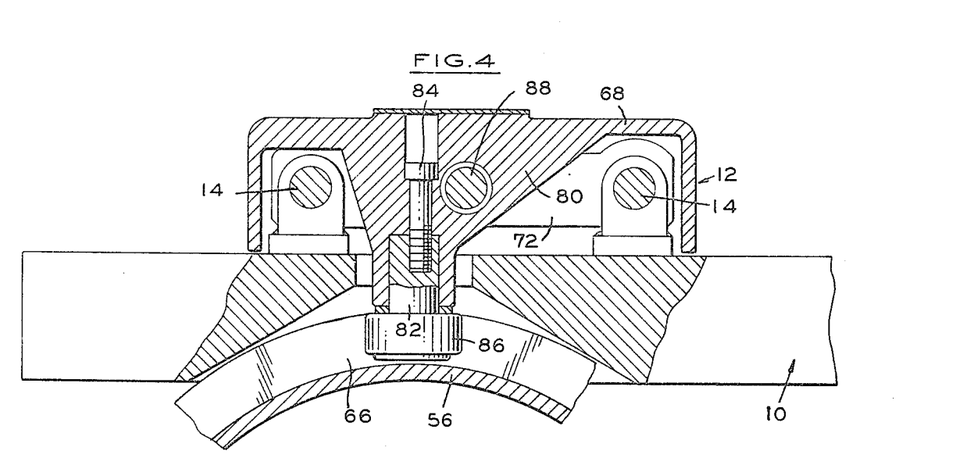
FIG. 4 is a sectional view along the line 4—4 in FIG. 1.

Referring now to FIGS. 3 and 4, it will be observed that carriage 12 is in the form of a generally hollow casting having a top wall 68, side walls 70 and generally open at the bottom side thereof. Within the carriage, there is slidably arranged on guide bars 14 a cross-head 72. Cross-head 72 has a downwardly projecting pin 74 secured thereto as by a screw 76 and the lower end of pin 74 has a roller 78 journalled thereon. Roller 78 has a relatively close fit with cam groove 64 and provides a cam follower for cross-head 72.

At one portion thereof, top wall 68 of carriage 12 has an integral boss 80 depending from the underside thereof. Boss 80 has a depending pin 82 secured thereto as by a screw 84. A roller 86 is journalled on the lower end of pin 82. Roller 86 has a relatively close fit with cam groove 66 and serves as a cam follower on carriage 12.

As is shown in FIG. 3, cross-head 72 has a shaft 88 secured thereto as by a pin 90. Shaft 88 extends lengthwise of carriage 12, and is parallel to guide bars 14. Adjacent its opposite ends shaft 88 is formed with gear rack portions 92 (FIG. 1), and these gear rack portions mesh with pinion gears 94 located within and adjacent opposite ends of carriage 12. The opposite end portions of carriage 12, where the pinions 94 are located, have a bottom wall 96 in which the lower ends of pinions 94 are journalled as by bearings 98. The upper end of each pinion 94 is fashioned as a circular boss 100 which is journalled on carriage 12 as by a bearing 102. A pin 104 is eccentrically mounted on each circular boss 100 and projects upwardly therefrom for connection with one end of a link 106 as at 108. The opposite end of each link 106 is connected as by a pin 110 with the adjacent laterally extending shaft 20. With this arrangement it will be observed that when pinions 94 are rotated, the pins 104 on each circular boss 100, acting through the links 106, cause the shafts 20 to be laterally extended and retracted from carriage 12. Adjacent each pinion 94 there is journalled in carriage 12 on the opposite side of rack portion 92 a grooved back-up roll 112 which minimizes the tendency for the opposite ends of shaft 88 to flex where the rack portions 92 mesh with the pinions 94.

As will be apparent from the above-described arrangement, cam groove 66 is designed to shift carriage 12 through its index stroke and back to the starting position during each revolution of the cam. In the arrangement illustrated, the index stroke of carriage 12 corresponds generally to the diameter of the workpieces 28. Cam groove 64 is designed to shift cross-head 72 relative to carriage 12 and in relation to the position of carriage 12 so that on the index stroke of the carriage the work-engaging fingers 24 grip the workpieces 28 and shift them longitudinally of the guide block 30 and on the retraction stroke of carriage 12 the fingers are first retracted to clear the peripheral edges of workpieces 28 and then extended to engage the next successive workpieces. In this connection it will be observed that the movement of carriage 12 is controlled exclusively by the shape of cam groove 66 and the movement of the work-engaging fingers 24 relative to the carriage is controlled exclusively by the shape of cam groove 64.

In the arrangement illustrated cam followers 78 and 86 are aligned in a direction parallel to the path of travel of carriage 12. This being so, it follows that during the index portion of the carriage, that is, while the carriage is moving forwardly in the direction of arrow 36, with the fingers 24 engaging the workpieces, the two cam followers 78, 86 must move in a fixed, spaced relationship, and thus during this portion of the stroke of the carriage, the two cam grooves 64, 66 are necessarily parallel. On the other hand, in the arrangement illustrated, when the work-engaging fingers 24 are being retracted the two cam followers 78, 86 move apart, and when the fingers are being projected to the work-engaging position the two cam followers 78, 86 are moving toward one another.

Figure 14:
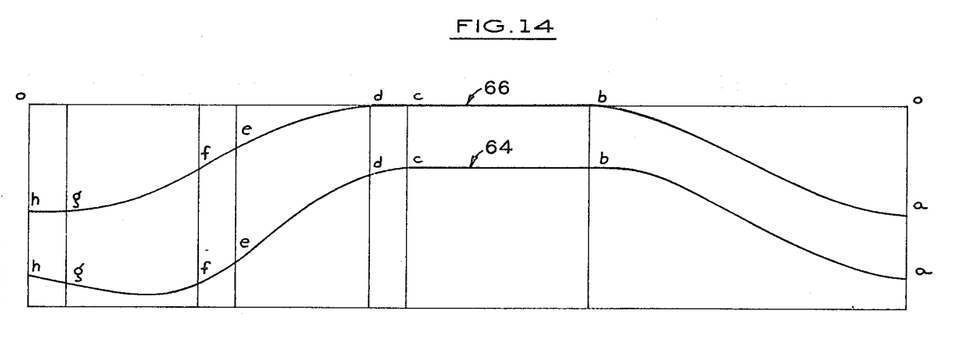
FIG. 14 is a diagrammatic view illustrating the cam with the cam grooves therein developed in a flat plane.

In FIG. 14, there is illustrated the shape of the two cam grooves 64, 66 laid out in the flat. Actually the grooves themselves are not shown on FIG. 14, but rather the paths of travel of cam followers 78, 86 along the pitch line of the cam grooves. For purposes of simplification these pitch lines bear the same numeral designations as the grooves which they represent. Thus the pitch line for the groove in which cam follower 86 on the carriage travels is designated 66 and the pitch line of the groove in which the cam followers 78 on cross-head 72 travels is designated 64.

The cycle of one revolution of cam cylinder 56 is shown in a direction from right to left in FIG. 14. The starting point for the curves shown in FIG. 14 is arbitrarily assumed to be the position of carriage 12 and fingers 24 as shown in FIG. 1, that is, the position in which the workpieces 28 are engaged by the fingers 24 and the carriage 12 is about to index the workpieces to the next successive station. This point is designated $a$ on both curves. Between the points $a$ and $b$ the two cam grooves are parallel and thus the two cam followers 78, 86 are caused to move in unison in fixed, spaced relation. As the cam followers travel in the cam grooves from the point $a$ to the point $b$, the carriage is displaced through the distance $ao$ which constitutes the index stroke of the carriage. From the point $b$ to $c$ the two grooves 64, 66 are not only parallel but also extend normal to the path of travel of the carriage and thus while the cam followers travel the two grooves between the points $b$ and $c$ both the carriage and the fingers remain stationary for a predetermined dwell period. This dwell period can be shortened or lengthened to accommodate the operation being performed. In any event it is obvious that the fingers 24 should begin to retract before the carriage 12 starts to retract. Thus from the point $c$ to $d$ groove 66 continues as a straight line while groove 64 diverges therefrom. At the point $d$ the fingers 24 have retracted away from the workpieces a distance sufficient to permit initiation of the retraction stroke of the carriage. Thus, from the point $d$ to $e$ cam groove 66 slopes away from the datum line O and at the same time cam groove 64 slopes away from the datum line O at a greater rate. Thus, between the points $d$ and $e$ the two cam followers 78, 86 are moving apart. After the fingers 24 have retracted from the workpieces 28 a sufficient distance in relation to the position of the carriage, they remain fixed relative to the carriage and thus the two grooves are parallel between the points $e$ and $f$. Thereafter, while the carriage is continuing its retraction stroke, the fingers are caused to move in the work-engaging direction and thus the two cam grooves converge from the point $f$ to the point $g$. At the point $g$ the carriage has returned to the position illustrated in FIG. 1 and thus with respect to the pitch line 66 of FIG. 14 the distance $go$ is equal to the distance $ao$. From the point $g$ to the point $h$ the pitch line 66 is parallel to the datum line O and the carriage remains stationary. However, the fingers 24 continue to move inwardly toward the workpieces, as is indicated by the curve $gh$ on the pitch line 64, to a position wherein the fingers engage the workpieces and their movement in the work-engaging direction is then arrested. Thus, when the cam follower 78 reaches the point $h$ in its cam groove 64, the work-engaging fingers 24 also assume the position shown in FIG. 1.

Thus, to recapitulate the movement of carriage 12 and fingers 24 for one complete revolution of cam cylinder 56, as the two cam followers move in their respective grooves from the points $a$ to the points $b$, carriage 12 is advanced through its index stroke while the work-engaging fingers remain fixed relative to the carriage in the work-engaging position. Thereafter as the two cam followers move through their respective grooves from the point $b$ to point $c$, both the carriage and the fingers are in the dwell position but the carriage remains in the dwell position as its cam follower 86 travels in its groove from the point $c$ to point $d$. However, during this terminal dwell portion of the carriage the cam follower 78, which actuates the fingers, follows the path $c$ to $d$ in its groove 64 and thus begins to move away from the cam follower 86. The fingers 24 thus begin to retract. Between the points $d$ and $e$ the two cam grooves continue to diverge and thus the fingers continue to retract as the carriage moves through its retraction stroke. Approximately halfway through the retraction stroke of the carriage the fingers have completely cleared the workpieces and are in the fully retracted position when the two cam rollers reach the points $e$ in their respective grooves. Between the points $e$ and $f$ the carriage 12 continues to retract with the fingers 24 in the fully retracted position. During the terminal portion of the retraction stroke of the carriage, that is, while its cam follower 86 is traveling between the points $f$ and $g$ in its cam groove 66, cam follower 78 begins to move toward cam follower 86 and the fingers 24 are projected in the work-engaging direction. While the carriage remains in its fully retracted position for a short dwell period (the distance $hg$ in cam groove 66), the fingers move into the fully engaged position with the workpieces to initiate a new cycle. The path of travel of the fingers for the cycle illustrated is shown diagrammatically by the broken line in FIG. 1.

Figure 7:
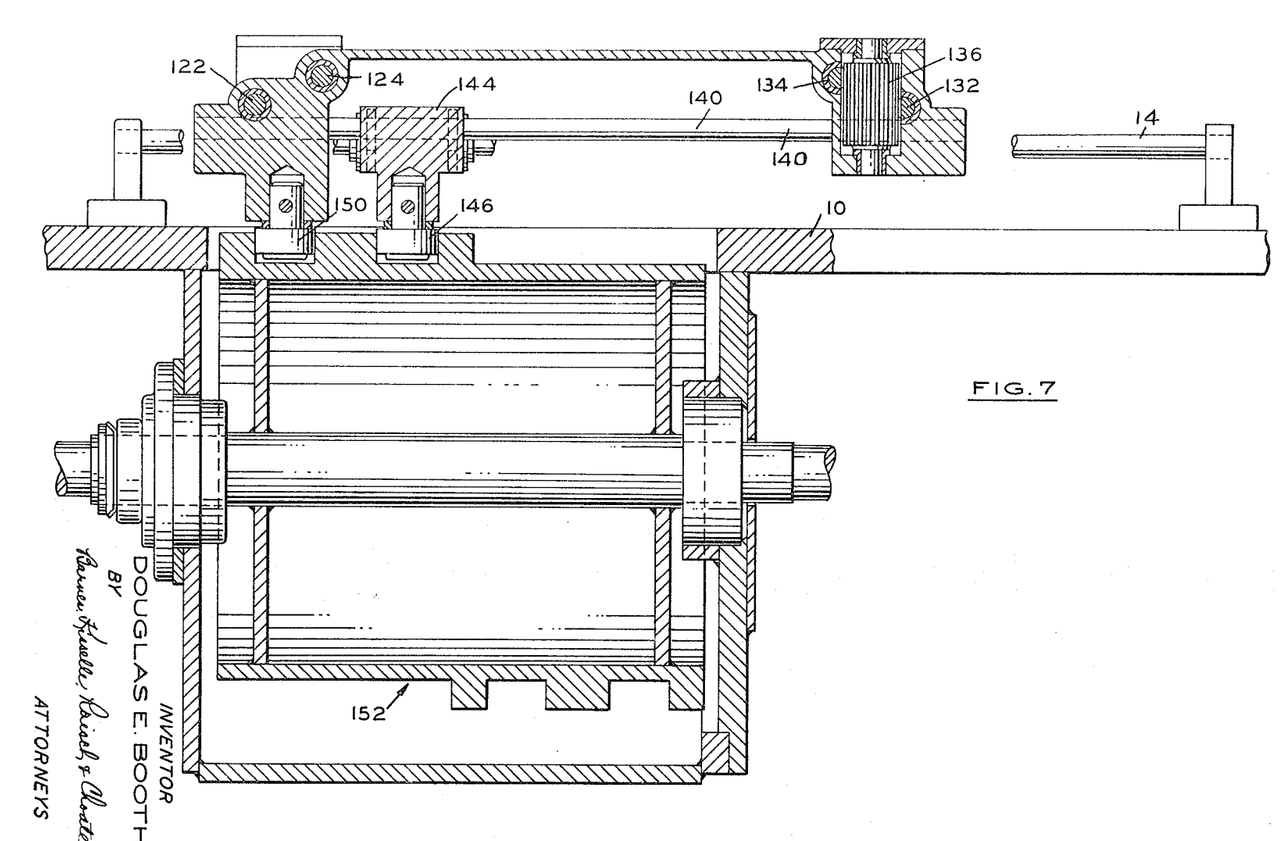
FIG. 7 is a sectional view taken along the line 7—7 in FIG. 6.
Figures 8, 9:
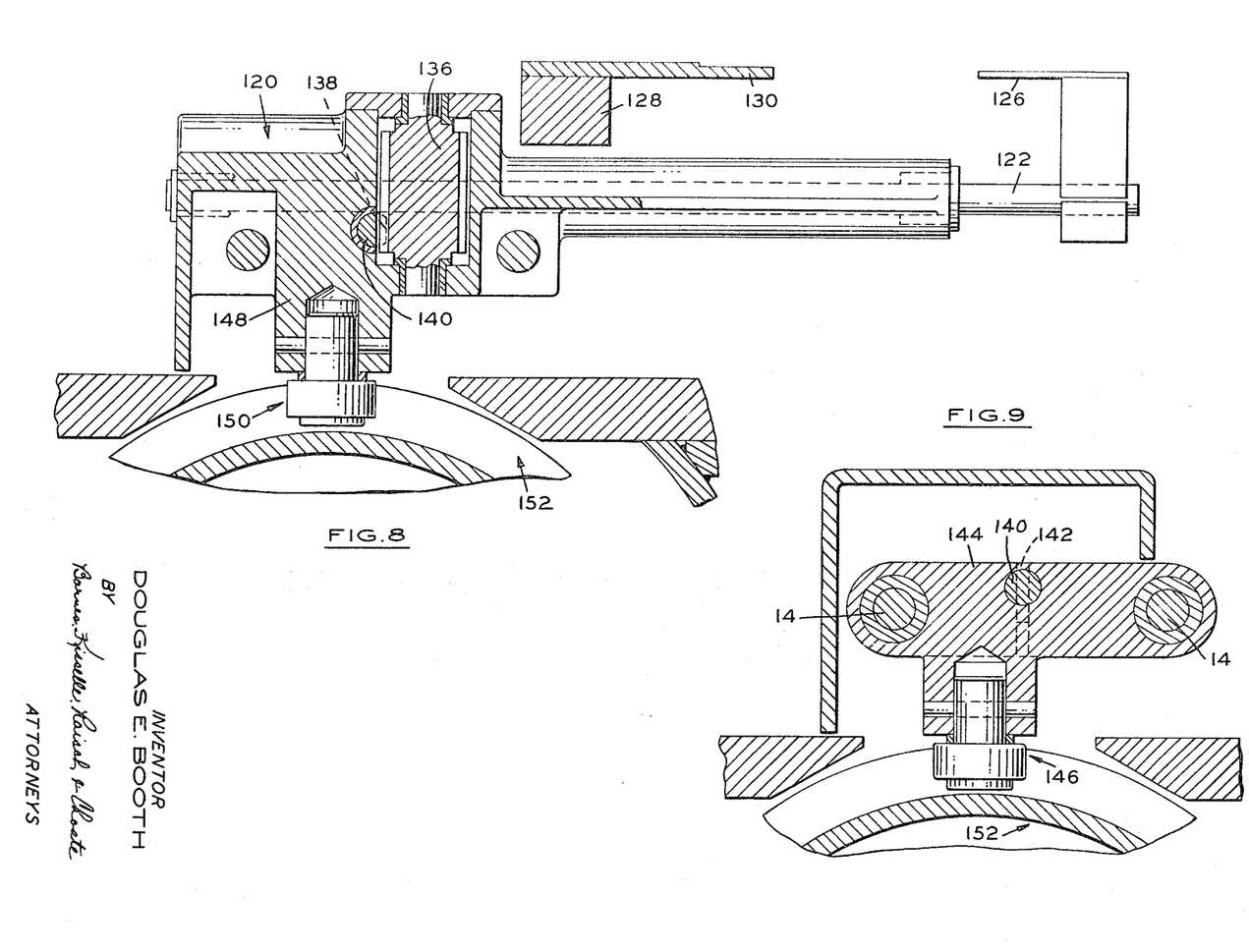
FIG. 8 is a sectional view taken along the line 8—8 in FIG. 6.
FIG. 9 is a sectional view taken along the line 9—9 in FIG. 6.
Figure 10:
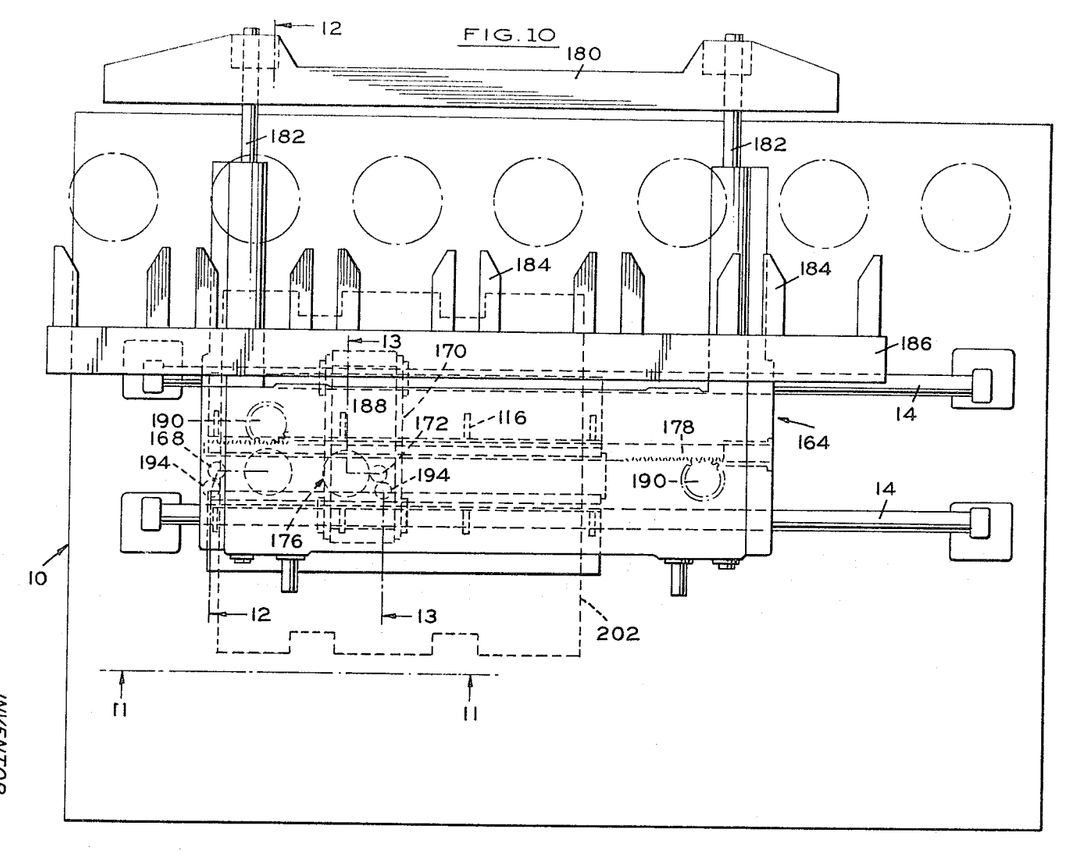
FIG. 10 is a top plan view of a further modified form of transfer device according to the present invention.
Figure 11:
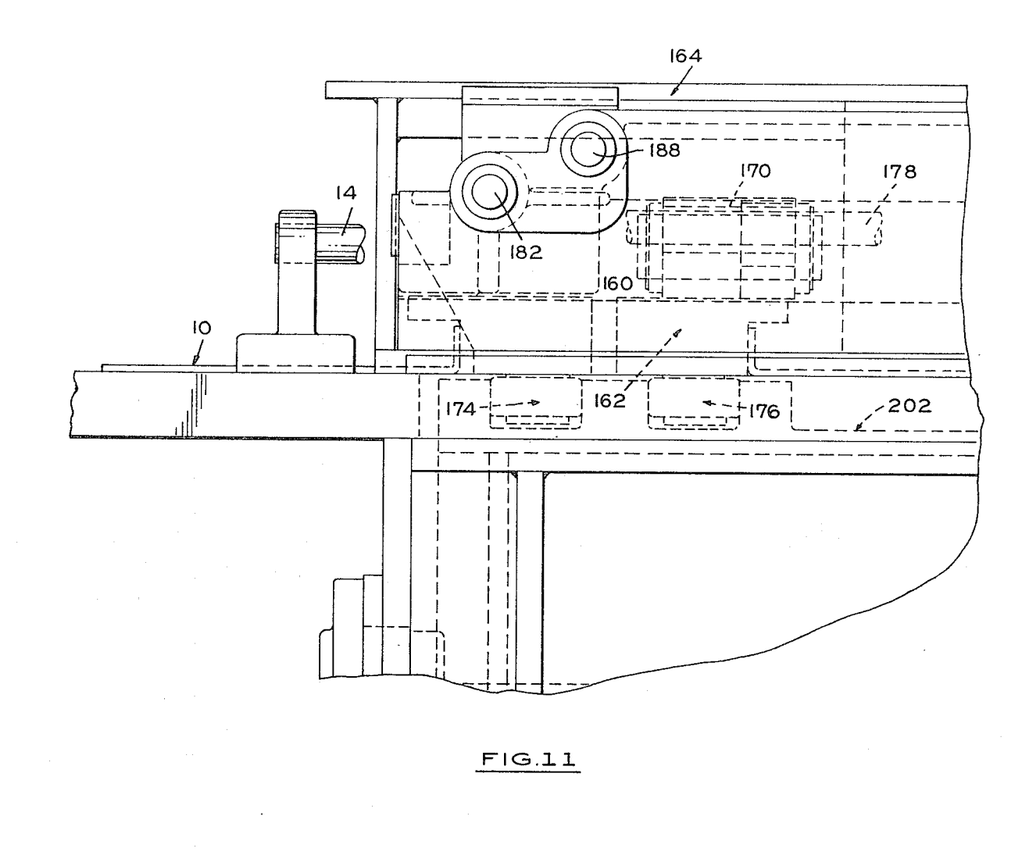
FIG. 11 is a fragmentary, side elevational view of the transfer device shown in FIG. 10, as viewed along the arrows 11 in FIG. 10.

The transfer device illustrated in FIGS. 6 through 9 is similar in principle of operation to that previously described. However, in the embodiment illustrated in FIGS. 6 through 9, instead of employing one set of work-engaging fingers for indexing the workpieces along the fixed guide bar, such as shown at 32, the carriage 120 has two sets of laterally extending shafts slidably mounted thereon. One set of these shafts is designated 122 and the other set is designated 124. The laterally extending free ends of shafts 122 are interconnected by a tie bar 126 and the free ends of shafts 124 are interconnected by a tie bar 128 on which work-engaging fingers 130 are secured in spaced-apart relation. Shafts 122 and 124 extend transversely through carriage 120 in parallel relation and are mounted thereon for sliding movement by suitable bushings. Intermediate their ends each shaft 122 is formed with a rack portion 132 and each shaft 124 is formed with a rack portion 134 (FIG. 7). The rack portions 132, 134 are disposed on opposite sides of and interengage with pinions 136. Each pinion 136 engages a rack portion 138 at the opposite ends of a rod 140. Intermediate the rack portions 138, the rod 140 is connected, as by a pin 142, with the cross-head 144 that is slidably mounted on the guide bars 14 on base 10. Cross-head 144 supports a cam follower generally designated 146 which is constructed and operates the same as the cam follower 78 in the transfer device illustrated in FIGS. 1 through 5. Likewise, carriage 120 has a depending boss 148 on the underside thereof which supports a cam follower 150, the construction and operation of which is the same as the cam follower 86 in the embodiment illustrated in FIGS. 1 through 5. The cam cylinder 152 is constructed and operates in the same manner as cam cylinder 56.

The essential difference between the embodiment illustrated in FIGS. 6 through 9 from the embodiment previously described resides in the provision of two sets of work-engaging members, namely, the fingers 130 and the bar 126, and the manner in which these are operated. By arranging the two sets of rods 122, 124 on opposite sides of the pinions 136, it will be observed that fingers 130 and bar 126 are caused to move toward and away from one another as the cross-head 144 moves relative to carriage 120. In other respects the operation of the transfer device shown in FIGS. 6 through 9 is the same as that shown in FIGS. 1 through 5.

It will be appreciated, of course, that the configuration of the cam grooves can be varied as desired, depending upon the size and configuration of the workpieces being indexed and the purpose for which the workpieces are being indexed, that is, whether they are merely being indexed through a progressive die or whether they are being indexed through progressive stations and held there by the work-engaging fingers while an operation is being performed thereon. In this connection it will be appreciated that the cylindrical cam can be made smaller if desired and the displacement of the cam followers by the cam grooves thereon can be amplified relative to the carriage and finger movements by means of gears or the like. Likewise, the cam cylinder can be rotated by any suitable means that are synchronized with the operation being performed.

The transfer device illustrated in FIGS. 10 through 13 is in general very similar to that illustrated in FIGS. 6 through 9, and differs therefrom primarily in that a frangible connection is provided between each cam follower and the mechanism which it operates which is capable of breaking in the event that an obstruction is encountered in the transfer motion. Thus, in the arrangement illustrated in FIGS. 10 through 13, a pair of slides 160 and 162 are guided for movement on base 10 in a direction parallel to the path of travel of carriage 164 by means of guide bars 166. Slide 160 is connected to move with carriage 164 by means of a shear pin 168 and slide 162 is connected to move with cross-head 170 by means of a shear pin 172. Slide 160 has a cam follower 174 mounted thereon (FIG. 11) and slide 162 has a cam follower 176 connected thereto. As is the case with the previous embodiments illustrated, cross-head 170 has a rod 178 pinned thereto for actuating the work-engaging members. In the case of the device illustrated in FIGS. 10 through 13, the work-engaging members comprise a work-gripping bar 180 interconnecting rods 182 and work-gripping fingers 184 mounted on a tie bar 186 interconnecting rods 188. Rods 182 and 188 are formed with rack portions which interengage with pinions 190, which in turn interengage with rack portions at the opposite end of rod 178 which is pinned to cross-head 170.

With this arrangement, it will be observed that should the carriage 164 encounter an obstruction which prevents movement through its normal stroke, shear pin 168 will break, and if the fingers 184 or bar 180 encounter an obstruction, shear pin 172 will break. Thus the shear pins 168 and 172 form the weakest link in the operative connection between the two cam followers and the respective mechanisms which they operate, and prevent serious damage to the transfer device in the event an obstruction is encountered which prevents normal functioning of the device.

Figures 12, 13:
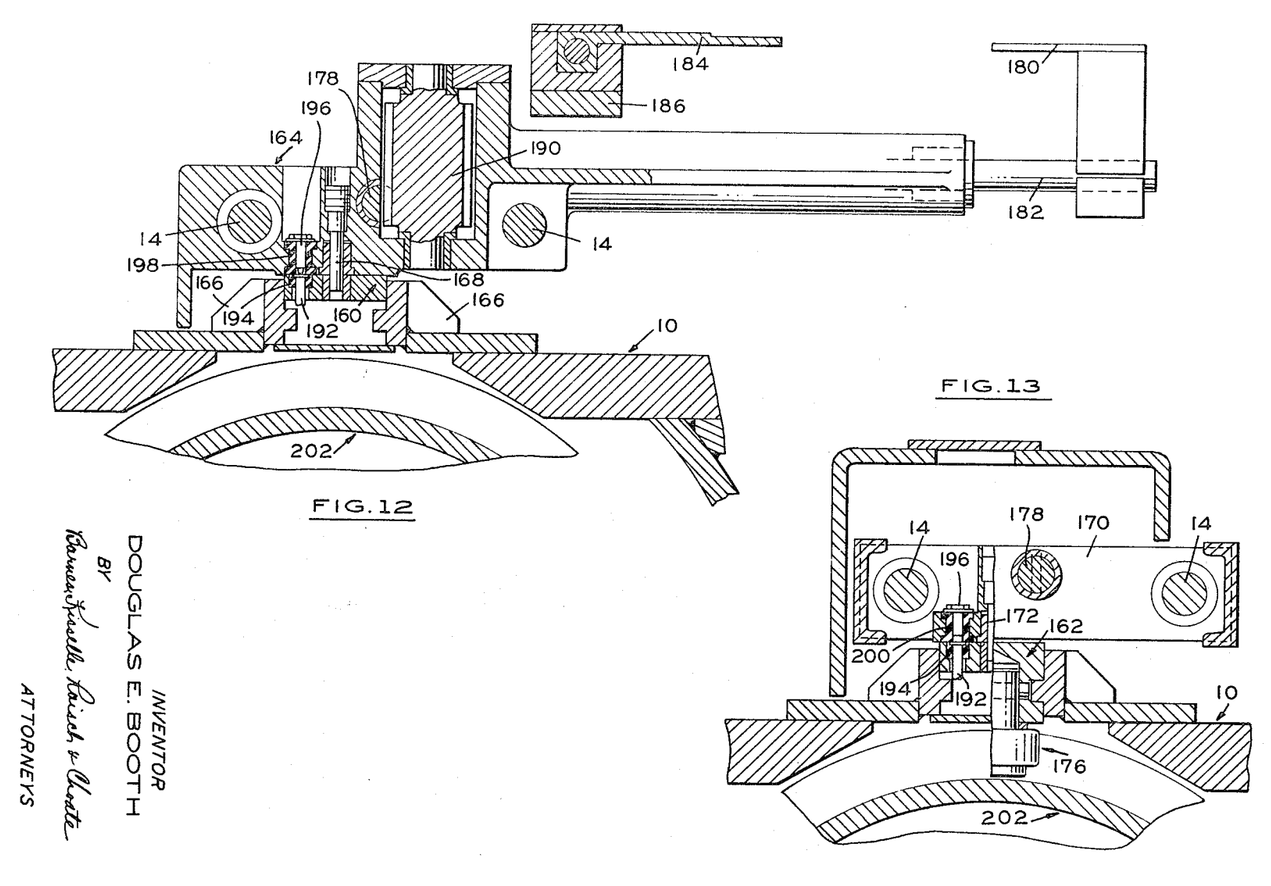
FIG. 12 is a sectional view taken along the line 12—12 in FIG. 10.
FIG. 13 is a sectional view taken along the line 13—13 in FIG. 10.

As an added precaution, in the embodiment illustrated in FIGS. 10 through 13, each slide has a contact pin 192 insulatively mounted thereon as by means of bushing 194 formed of a dielectric material. Each contact pin 192 is in turn contacted by a stud 196. One of the studs 196, as is shown in FIG. 12, is mounted on the carriage 164 by an insulating bushing 198 and the other contact stud 196 is mounted on cross-head 170 by an insulating bushing 200. Contact pins 192 and studs 196 are connected in series with the electrical motor which operates the cam cylinder 202. With this arrangement it will be seen that if either shear pin 172 or shear pin 168 should break, the associated contact pin 192 and stud 196 will shift out of contact, thus breaking the circuit to the motor which drives the cam cylinder to stop the operation of the device.

Thus it will be seen that the present invention provides a transfer device which is of simple and economical construction. One of the primary features resides in the provision of a single rotary cam and the independent operative connections between the carriage and the cam and between the fingers and the cam. These independent operative connections enable determination of the path of travel of the work-engaging members to any desired configuration by the appropriate design of the cam grooves, and the relative movement of the work-engaging members and the carriage can be determined as desired by merely correlating the shape of the two cam grooves.

I claim:

1. A device for transferring workpieces through successive stations comprising a fixed support, a carriage guided exclusively for rectilinear movement on said support, a plurality of work-engaging members projecting laterally of the carriage and mounted on said carriage for movement thereon in a path generally transversely of the path of travel of the carriage to and from extended work-engaging and retracted positions, actuating means mounted on said carriage for reciprocation thereon in a path generally parallel to the path of travel of the carriage and operatively connected with said work-engaging members for moving the latter when the actuating means are reciprocated relative to the carriage, cam means movably mounted on said support and having a pair of cam tracks therein, a first cam follower engaging one of said cam tracks, a second cam follower engaging the other cam track, one of said cam followers having an operative connection with the carriage for displacing the carriage relative to said support and the other having an operative connection with the actuating means for producing translatory and transverse movement of the work-engaging members, means for moving said cam means to move said two cam tracks simultaneously and produce displacement of said cam followers, said two operative connections being independent of one another such that movement of the carriage relative to said support is caused solely by displacement of one of said cam followers and movement of the actuating means relative to said support is caused solely by displacement of the other cam follower, said cam tracks having one set of corresponding portions in which the two cam followers are simultaneously engaged and by means of which the two cam followers are simultaneously displaced for causing said actuating means and carriage to move in unison and at the same rate whereby to retain the work-engaging members in the extended work-engaging position while the carriage is moving in one direction between successive stations, and having another set of corresponding portions in which the two cam followers are simultaneously engaged for causing the actuating means to move relative to the carriage and to said support whereby to cause the work-engaging members to extend or retract.

2. A transfer device as called for in claim 1 wherein the cam means are mounted for rotation on said support.

3. A transfer device as called for in claim 1 wherein the cam means comprises a barrel cam rotatable on said support about an axis extending generally parallel to the path of travel of the carriage and the cam tracks extend circumferentially around said cam.

4. A transfer mechanism as called for in claim 1 wherein the two cam followers are aligned in a direction generally parallel to the path of travel of the carriage and wherein the first set of corresponding track portions are parallel and the second set of corresponding track portions are inclined relative to one another.

5. A transfer device as called for in claim 1 wherein the second set of corresponding track portions are converging in part and diverging in part.

6. A transfer device as called for in claim 1 wherein said first set of track portions are shaped to displace both of said cam followers simultaneously at the same rate relative to said support.

7. A transfer device as called for in claim 1 wherein the cam tracks have a third set of corresponding portions adapted to retain both cam followers stationary relative to the support.

8. A transfer device as called for in claim 1 wherein the first cam follower is connected to move bodily with said carriage and the second cam follower is connected to move bodily with said actuating means.

9. A device for transferring workpieces through successive stations comprising a support, a carriage guided for reciprocation in a rectilinear path on said support, said carriage having a pair of arms thereon extending laterally thereof and having work-engaging members at the free, laterally extending ends thereof, said arms being movable on said carriage such that the work-engaging members move toward and away from one another in unison to grip and release a workpiece therebetween actuating means interconnecting said arms for producing the aforementioned movement, a rotatable cam on said support having a pair of cam grooves thereon, a cam follower in each of said grooves, one of said cam followers being operatively connected with said carriage for displacing the carriage relative to said support and the other cam follower being operatively connected with said actuating means for producing translatory and transverse movement of the work-engaging members, said cam followers being adapted to be displaced by said cam grooves when the cam is rotated so as to displace said carriage and said actuating means, said operative connections being independent of one another such that movement of the carriage relative to the support is caused solely by displacement of one cam follower and movement of said actuating means relative to said support is caused solely by displacement of the other cam follower, one of said cam grooves being shaped to displace said carriage between successive stations and the other cam groove being shaped to displace said actuating means at the same rate as said carriage during a portion of one revolution of the cam and to displace said actuating means at a rate different from the rate of displacement of the carriage during another portion of one revolution of the cam.

10. A transfer mechanism as called for in claim 1 wherein the first set of corresponding track portions are shaped to displace both cam followers simultaneously through substantially equal distances and the second set of corresponding track portions are shaped to displace the two cam followers simultaneously through unequal distances.

11. A transfer mechanism as called for in claim 1 wherein the cam means are located below the carriage and rotatable about an axis which is offset laterally from the longitudinal path of travel of the work gripping ends of the work-engaging members in the extended position.

References Cited

UNITED STATES PATENTS 2,934,194   4/1960   Adams _______________ 198—19

EDWARD A. SROKA, *Primary Examiner.*